US012152750B2

(12) United States Patent
Laminette et al.

(10) Patent No.: US 12,152,750 B2
(45) Date of Patent: Nov. 26, 2024

(54) MOTOR-VEHICLE LIGHTING MODULE

(71) Applicant: VALEO VISION, Bobigny (FR)

(72) Inventors: Maxime Laminette, Bobigny (FR); Jean-Francois Doha, Bobigny (FR); Francisco Ruiz, Martos (ES); Clement Olchewsky, Bobigny (FR); Ibrahima Ndiaye, Bobigny (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 18/257,469

(22) PCT Filed: Dec. 16, 2021

(86) PCT No.: PCT/EP2021/086329
§ 371 (c)(1),
(2) Date: Jun. 14, 2023

(87) PCT Pub. No.: WO2022/129426
PCT Pub. Date: Jun. 23, 2022

(65) Prior Publication Data

US 2024/0102626 A1 Mar. 28, 2024

(30) Foreign Application Priority Data

Dec. 18, 2020 (FR) ....................................... 2013760

(51) Int. Cl.
*F21S 41/365* (2018.01)
*F21S 41/143* (2018.01)
(Continued)

(52) U.S. Cl.
CPC ........... *F21S 41/365* (2018.01); *F21S 41/143* (2018.01); *F21S 41/265* (2018.01); *F21S 41/337* (2018.01);
(Continued)

(58) Field of Classification Search
CPC ........ F21S 41/147; F21S 41/148; F21S 41/25; F21S 41/26; F21S 41/265; F21S 41/27;
(Continued)

(56) References Cited

U.S. PATENT DOCUMENTS 5,477,440 A * 12/1995 Brun ........................ F21S 45/47
362/345
9,631,786 B2 4/2017 Honda
(Continued)

FOREIGN PATENT DOCUMENTS

CN 206036884 U * 3/2017
DE 102015202019 A1 8/2015
(Continued)

OTHER PUBLICATIONS

Machine translation of FR 3052535 A1 retrieved from the FIT database of PE2E search. (Year: 2024).*
(Continued)

*Primary Examiner* — Colin J Cattanach
(74) *Attorney, Agent, or Firm* — Valeo Vision

(57) ABSTRACT

A lighting module for a motor vehicle, including a first lighting submodule with a light source that is able to form a first light beam, a second lighting submodule that is able to form a second light beam, a second projecting lens for projecting the second light beam, adjoining the first projecting lens, and an optical device configured to return, towards the second projecting lens, light rays coming directly from the light source of the first lighting submodule and passing in front of the reflective surface of the first lighting module so as to give the second projecting lens an illuminated appearance while the second lighting submodule is off.

14 Claims, 5 Drawing Sheets

(51) Int. Cl.

| | |
|---|---|
| ***F21S 41/147*** | (2018.01) |
| ***F21S 41/148*** | (2018.01) |
| ***F21S 41/24*** | (2018.01) |
| ***F21S 41/25*** | (2018.01) |
| ***F21S 41/26*** | (2018.01) |
| ***F21S 41/265*** | (2018.01) |
| ***F21S 41/27*** | (2018.01) |
| ***F21S 41/275*** | (2018.01) |
| ***F21S 41/33*** | (2018.01) |
| ***F21S 41/36*** | (2018.01) |
| ***F21V 11/08*** | (2006.01) |
| ***F21V 11/12*** | (2006.01) |
| ***F21V 11/14*** | (2006.01) |
| ***F21W 102/155*** | (2018.01) |

(52) U.S. Cl.
CPC ............ *F21S 41/147* (2018.01); *F21S 41/148* (2018.01); *F21S 41/24* (2018.01); *F21S 41/25* (2018.01); *F21S 41/26* (2018.01); *F21S 41/27* (2018.01); *F21S 41/275* (2018.01); *F21S 41/36* (2018.01); *F21V 11/08* (2013.01); *F21V 11/12* (2013.01); *F21V 11/14* (2013.01); *F21W 2102/155* (2018.01)

(58) Field of Classification Search
CPC ........ F21S 41/275; F21S 41/36; F21S 41/365; F21V 11/08; F21V 11/12; F21V 11/14
See application file for complete search history.

(56) References Cited

U.S. PATENT DOCUMENTS

| | | | | |
|---|---|---|---|---|
| 9,671,079 B2 | 6/2017 | Honda | | |
| 10,612,743 B2 | 4/2020 | Shih | | |
| 11,022,266 B2 | 6/2021 | Hermitte et al. | | |
| 2007/0086202 A1* | 4/2007 | Tsukamoto | ........... | F21S 41/155 362/514 |
| 2015/0219301 A1* | 8/2015 | Honda | .................. | F21S 41/255 362/520 |

FOREIGN PATENT DOCUMENTS

| | | | | |
|---|---|---|---|---|
| FR | 3052535 A1 * | 12/2017 | ............ | F21S 41/147 |
| FR | 3093789 A1 | 9/2020 | | |
| JP | 2011243474 A | 12/2011 | | |
| JP | 2017212169 A | 11/2017 | | |
| KR | 20130123199 A | 11/2013 | | |
| WO | 2020025171 A1 | 2/2020 | | |

OTHER PUBLICATIONS

Machine translation of CN 206036884 U retrieved from the FIT database of PE2E search. (Year: 2024).*

European Patent Office, International Search Report (with English translation) and Written Opinion of corresponding International Application No. PCT/EP2021/086329, dated Mar. 7, 2022.

* cited by examiner

MOTOR-VEHICLE LIGHTING MODULE

TECHNICAL FIELD

The invention relates to the field of lighting, in particular lighting for a motor vehicle. The invention notably relates to a lighting module intended to be assembled in a motor vehicle headlamp.

BACKGROUND OF THE INVENTION

It is generally known practice to produce a cutoff lighting beam by using one or more light-emitting modules with a folder. Such a light-emitting module conventionally comprises a collector with a reflective surface of revolution having an elliptical profile, in the form of a cap in a half-space delimited by a horizontal plane. An essentially point light source, of the light-emitting diode type, is located at a first focus of the reflective surface and shines into the half-space in the direction of said surface. The rays are thus reflected in a convergent manner towards a second focus of the reflective surface. Another, generally flat, reflective surface with a cutoff edge at the second focus ensures an upward reflection of the rays which do not pass precisely through the second focus, these rays then being refracted by a thick lens towards the bottom of the lighting beam. This reflective surface is commonly referred to as a “folder” in that it “folds”, towards the top of the projecting lens, those rays which would otherwise form an upper portion of the lighting beam. Such a light-emitting module has the drawback of requiring the folder and the cutoff edge to be positioned with a high degree of precision. Also, the projecting lens must be a thick lens because of its small focal length, this increasing its weight and complicating its production, notably as regards sink marks. In addition, the collector has a certain height and, thus, a certain heightwise bulk.

Published patent document WO 2020/025171 A1 discloses a light-emitting module, notably for a motor vehicle, comprising a collector with a reflective surface collecting and reflecting the light rays emitted by a light source in a light beam, similar to a light-emitting module with a folder. The light-emitting module also comprises a projecting optical system, such as a lens, specifically configured to project the light beam in question by forming an image of the reflective surface of the collector. To that end, the projecting optical system has a focus located on the reflective surface, for example at a rear edge of the latter so as to correctly image said edge and form a clean cut in the projected light beam. This type of light-emitting module has advantages of compactness, notably in height terms, and production simplicity. They can be combined to form various light beams that accrue.

Published patent document FR 3 093 789 A1 discloses a lighting module for a motor vehicle headlamp that incorporates the technology of the previous document by combining a first cutoff lighting submodule providing a lighting function of the low-beam type with a second lighting submodule with no cutoff which supplements the cutoff light beam to provide a lighting function of the high-beam type. This module, referred to as bi-function, has the drawback that the projecting lens or portion of projecting lens associated with the second lighting submodule, with no cutoff, is not illuminated during the lighting function of the low-beam type.

This absence of illumination can pose a problem relating to the overall appearance of the lighting module.

SUMMARY OF THE INVENTION

The aim of the invention is to mitigate at least one of the drawbacks of the abovementioned prior art. More particularly, the aim of the invention is to solve the problem of unilluminated appearance of a portion of the projecting lens of a bi-function lighting module.

A subject of the invention is a lighting module for a motor vehicle, comprising a first lighting submodule, which is configured to produce a first light beam and comprises:

- a subassembly with a primary light source and a primary collector with a reflective surface that is able to reflect light rays emitted by said primary light source in a primary reflected light beam;
- a first projecting lens configured to project at least the majority of said primary reflected light beam in a primary projected light beam at least partially forming said first light beam.

The lighting module further comprises a second lighting submodule, which is configured to produce a second light beam and comprises a second projecting lens for projecting the second light beam, adjoining the first projecting lens.

According to the invention, the lighting module further comprises an optical device configured to return, towards the second projecting lens, light rays coming directly from the primary light source of the first lighting submodule and passing in front of the reflective surface of the primary collector of the first lighting submodule so as to give said second projecting lens an illuminated appearance while the second lighting submodule is off.

By way of example, the optical device is disposed between the subassembly and the first projecting lens.

According to the invention, the first beam can be a beam with an upper cutoff having a horizontal portion, notably a low beam.

According to the invention, the second beam can be a beam with a lower cutoff having a horizontal portion, notably a complementary high beam. The features in this paragraph can be combined with those in the preceding one and in this case, the second beam, together with the low beam, forms a high beam, the lower cutoff coinciding with the upper cutoff. The lighting module is thus a low-beam/high-beam bi-function module.

According to one embodiment of the invention, the second lighting submodule may comprise a light source, a collector with a reflective surface that is able to reflect light rays emitted by said light source in a second reflected light beam. The second projecting lens is configured to project at least the majority of said second reflected light beam in a second projected light beam forming the second light beam. In this case, the optical device is disposed between, for the one part, the light source and the collector and, for the other part, the second projecting lens.

In another embodiment, the second submodule may comprise a light source; an optical element that is able to deflect at least the majority of the rays emitted by the light source of the second lighting submodule towards the second projecting lens. Said optical element may comprise one or more lenses, one or more reflectors, one or more light guides, or a combination of these possibilities. In this case, the optical device is disposed between the optical element and the second projecting lens.

According to the invention, the one or more light sources can be light-emitting diodes, also referred to as LEDs.

According to one embodiment of the invention, the first lighting submodule and the second lighting submodule may be disposed on either side of a dividing plane, the rays returned by the optical device passing through said dividing plane.

In this instance, the dividing plane divides the space in the lighting module into a first space, dedicated to the first lighting submodule, and a second space, dedicated to the second lighting submodule.

According to one embodiment of the invention, the optical device may comprise a first reflecting surface configured to reflect the light rays coming directly from the primary light source of the first lighting submodule in reflected light rays, and a second reflecting surface configured to reflect said reflected light rays towards the second projecting lens.

According to one embodiment of the invention, the first reflecting surface may have a parabolic or elliptical profile such that the light rays reflected by said first reflecting surface converge. The parabolic or elliptical profile may be in a longitudinal plane, comprising the optical axis of the lighting module, and/or in a transverse plane, perpendicular to said optical axis. The convergence of the rays reflected by the first reflecting surface furthermore makes it possible to concentrate the rays at the point at which they pass through the dividing plane, thus limiting the space required for them to pass through.

According to another embodiment of the invention, the first reflecting surface may have a flat surface or one having another shape suitable for returning the light rays coming directly from the primary light source of the first lighting submodule towards the second reflecting surface.

According to one embodiment of the invention, the lighting module comprises a support for the first lighting submodule and/or the second lighting submodule, extending along the dividing plane and having an orifice that is suitable for being traversed by the rays reflected by the first reflecting surface.

According to one embodiment of the invention, the second reflecting surface may have a rough surface structure. In other words, the second reflecting surface has reliefs on its surface.

According to one embodiment of the invention, the second reflecting surface has regular reliefs.

The second reflecting surface may be configured to reflect, in a scattering manner, the reflected light rays coming from the first reflecting surface and to direct them towards the second projecting lens.

According to one embodiment of the invention, the first reflecting surface is disposed on the same side of the dividing plane as the first lighting submodule, and the second reflecting surface is disposed on the same side of the dividing plane as the second lighting submodule.

According to one embodiment of the invention, the lighting module may further comprise a housing accommodating the first lighting submodule, the second lighting submodule, the first reflecting surface and/or the second reflecting surface being formed on or supported by said housing.

Advantageously, the second reflecting surface may be formed directly on the housing and advantageously is raised on average by at least 1 mm, more advantageously by at least 2 mm, and more advantageously still by at least 3 mm.

According to one embodiment of the invention, the first projecting lens may have a focal region located on the reflective surface of the primary collector, behind the primary light source of said first lighting submodule. The projecting lens is configured to image a portion of said reflecting surface that is located, along an overall direction of propagation of the reflected light rays in the first lighting submodule, behind the primary light source.

Advantageously, the focal region may be located at a rear edge of said reflective surface.

In general, this focal region may be a focal point, also referred to as focus, or may be a focal line, also referred to as focus line.

According to one embodiment of the invention, the subassembly is a first subassembly, the first lighting submodule further comprising a second subassembly having:

- a secondary light source;
- a secondary collector with a reflective surface that is able to reflect light rays emitted by said secondary light source in a secondary reflected light beam.

Moreover, said second subassembly may be recessed in the rearward direction, along an overall direction of propagation of the rays, in relation to the first subassembly. In other words, the second subassembly is positioned upstream of the first subassembly along the overall direction of propagation of the rays.

Furthermore, the first projecting lens may be configured to project at least the majority of said secondary reflected light beam in a secondary projected light beam. In this case, the primary projected light beam and the secondary projected light beam together form the first light beam.

In this instance, the first subassembly is also referred to as the first-category subassembly, while the second subassembly, which is recessed in relation to the first subassembly, is also referred to as the second-category subassembly.

Here, "the rays" in "the overall direction of propagation of the rays" are rays which contribute to the formation of the first light beam and the second light beam. Here, unless indicated otherwise, the overall direction of propagation of the rays in the first lighting submodule is parallel to an optical axis of said first lighting submodule. Similarly, the overall direction of propagation of the rays in the second lighting submodule is parallel to an optical axis of said second lighting submodule. Advantageously, the optical axis of the first lighting submodule may be parallel to the optical axis of the second lighting submodule.

According to one embodiment of the invention, the optical device may be configured to also return, towards the second projecting lens, light rays coming directly from the secondary light source and passing in front of the reflective surface of said secondary collector.

According to one embodiment of the invention, the optical device may comprise a third reflecting surface configured to reflect the light rays coming directly from the secondary light source of the second subassembly towards the second reflecting surface, said second reflecting surface being configured to also reflect the rays reflected by the third reflecting surface towards the second projecting lens.

The third reflecting surface is associated with the second subassembly of the first lighting submodule.

Advantageously, the third reflecting surface associated with the second subassembly may be recessed in the rearward direction, along the overall direction of propagation of the rays, in relation to the first reflecting surface.

The third reflecting surface may be integrated in the secondary collector. In this case, the third reflecting surface is disposed following the reflective surface of the secondary collector, but oriented differently in relation to said reflective surface. The third reflecting surface may also have a different profile from the reflective surface.

Advantageously, the third reflecting surface may be disposed on the same side of the dividing plane as the first lighting submodule.

Advantageously, the lighting module comprises a support shared by the first and second subassemblies of the first lighting submodule, extending along the dividing plane and having a first orifice that is suitable for being traversed by the rays reflected by the first reflecting surface, and a second orifice that is suitable for being traversed by the rays reflected by the third reflecting surface and which is recessed in the rearward direction, along an overall direction of propagation of the rays, in relation to the first orifice.

The measures of the invention are advantageous in that they make it possible to ensure illumination of the second projecting lens when the second lighting submodule is off, without an additional or auxiliary light source. The illumination of the second projecting lens is ensured with light rays of the first lighting submodule that would otherwise be lost. The optical device furthermore has a simple construction since it involves a low number of reflecting surfaces, in the present case two or three reflecting surfaces.

The invention also relates to a motor vehicle headlamp comprising a lighting module according to the invention.

Notably, according to the invention, the lighting module is a single device of which the components, notably the lighting submodules and the lens, are joined together. In other words, these components are joined together independently of the fastening means of the lighting module that are intended to fasten the latter in a headlamp.

The first and second lenses may be formed in one piece. The module has more of a unitary appearance.

The first and second lenses may each have a different focal length. The invention is particularly advantageous in such a case.

DETAILED DESCRIPTION OF THE INVENTION

In the following description, the concepts of "front" and "rear" are to be understood with respect to a main direction of propagation of the light along the optical axis of the first lighting submodule and the optical axis of the second lighting submodule.

Figure 1:
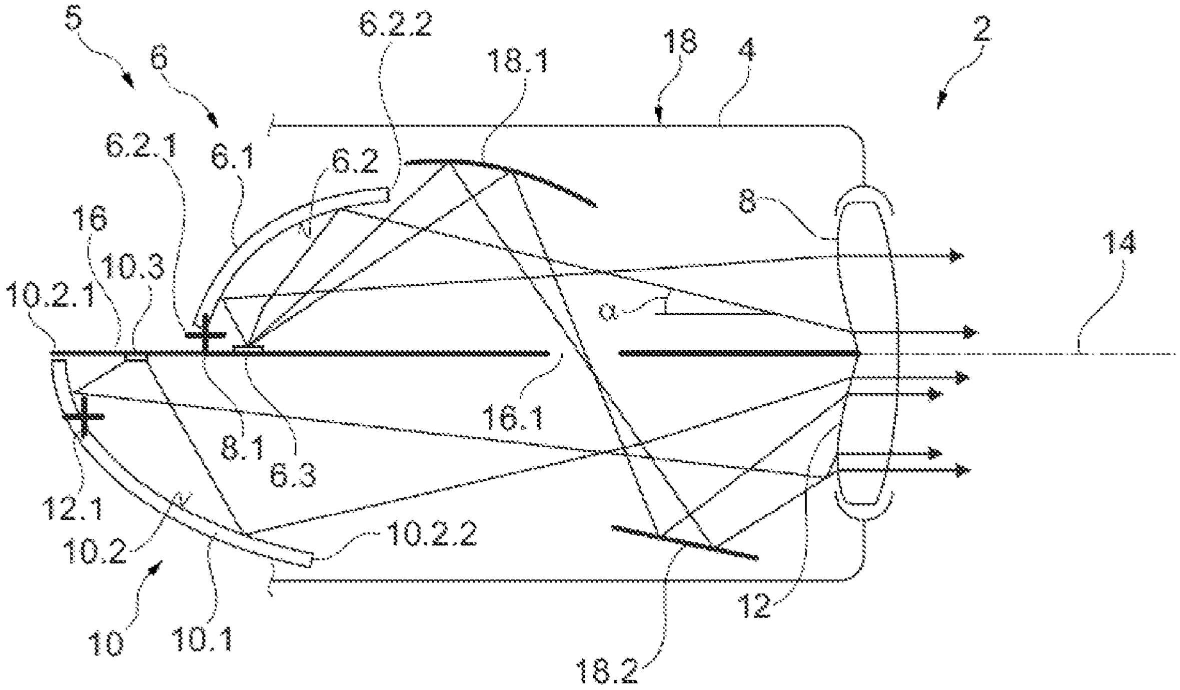
FIG. 1 is a functional schematic depiction, in longitudinal section, of a lighting module according to a first embodiment of the invention.

FIG. 1 is a functional schematic view, in longitudinal section, of a lighting module for a motor vehicle, according to a first embodiment of the invention.

The lighting module 2 comprises a housing 4, shown schematically, it being understood that it may have substantially more complex shapes and be made up of multiple parts joined together.

The lighting module 2 comprises a first lighting submodule 5 that is able to form a first light beam with a horizontal cutoff. The first lighting submodule 5 comprises a subassembly 6 comprising a first collector 6.1 provided with a reflective surface 6.2 that is able to collect and reflect the light rays emitted by a primary light source 6.3. The latter is advantageously of the semiconductor type, in the present case a light-emitting diode. It essentially provides light in a space delimited by a plane thereof, in a main direction which is perpendicular to said plane and directed towards the primary collector 6.1. The primary collector 6.1, and more particularly the reflective surface 6.2, has a recessed shape similar to that of a half-shell. The reflective surface 6.2 is configured to collect the majority of the light rays emitted by the primary light source 6.3 and at least partially form a first cutoff light beam or all of said first beam in the direction of a first projecting lens 8 forming part of the first lighting submodule 5.

The first light beam, emitted by the first projecting lens 8, provides a regulatory motor vehicle lighting function of the low-beam type. This function comprises a horizontal cutoff.

The lighting module 2 further comprises a second lighting submodule 10 that is able to form a second light beam.

Similarly to the first lighting submodule 5, the second lighting submodule 10 comprises a collector 10.1 provided with a reflective surface 10.2 and a light source 10.3. Still similarly to the first lighting submodule 5, the reflective surface 10.2 is configured to collect and reflect the light rays emitted by the light source 10.3 and form the second light beam in the direction of a second projecting lens 12 forming part of the second lighting submodule 10. The collector 10.1, and more particularly the reflective surface 10.2, has a recessed shape, similar to that of a half-shell, and the light source 10.3 provides light essentially in a space delimited by a plane thereof, in a main direction which is perpendicular to said plane and directed towards the collector 10.1.

Of course, the second lighting submodule 10 may have a different structure from that of the first lighting submodule 5. For example, the second lighting submodule may comprise a plurality of light sources, a plurality of light guides, each guide being associated with a light source so as to propagate the rays emitted by said source in the direction of the second projecting lens. In this example, the second lighting submodule may further comprise one or more additional lenses disposed between the guides and the projecting lens. The one or more additional lenses may be configured to correct optical aberrations, such as field aberrations.

The second light beam, emitted by the second projecting lens 12, supplements the first light beam, emitted by the first projecting lens 8, to provide a regulatory motor vehicle lighting function of the high-beam type. In another example, the second light beam may perform the regulatory motor vehicle lighting function of the high-beam type by itself.

It should be noted that the first and second lighting submodules 5 and 10 are opposite in relation to a dividing plane. In other words, the first and second lighting submodules 5 and 10 are disposed on either side of the dividing plane and are oriented oppositely, that is to say that the main lighting directions of their light sources 6.3 and 10.3 are opposite. Advantageously, the light sources 6.3 and 10.3 in question may be disposed on a common support 16. The latter extends in a dividing plane and advantageously forms a plate. In FIG. 1, the common support 16 is shown schematically by a line, it being understood, however, that it has a non-zero thickness.

Of course, the support 16 may serve as support solely for the first lighting submodule 5. In this case, another support separate from the support 16 is assigned to the second lighting submodule 10.

The reflective surfaces 6.2 and 10.2 advantageously have a profile of the elliptical or parabolic type. One or each of these is advantageously a surface of revolution about an axis parallel to the optical axis of the corresponding lighting module. Alternatively, it may be a question of a free-form surface or a swept surface or an asymmetric surface. It may also have a plurality of sectors. The expression "parabolic type" generally applies to reflective surfaces having a single focus, that is to say one region of convergence of the light rays such that the light rays emitted by a light source placed in this region of convergence are projected to a great distance after reflection at the surface. Projected to a great distance means that these light rays do not converge towards a region located at least at 10 times the dimensions of the reflective surface. In other words, the reflected rays do not converge towards a region of convergence or, if they do converge, this region of convergence is located at a distance greater than or equal to 10 times the dimensions of the reflective surface. A surface of the parabolic type can therefore have or not have parabolic portions. A collector having such a surface is generally used alone to create a light beam. Alternatively, it may be used as projecting surface associated with a collector of the elliptical type. In this case, the light source of the collector of the parabolic type is the region of convergence of the rays reflected by the collector of the elliptical type.

Each of the light sources 6.3 and 10.3 is disposed at a focus of the corresponding reflective surface 6.2 and 10.2 so that its rays are collected and reflected along the optical axis of the corresponding lighting module. At least some of these reflected rays have angles of inclination a, in a vertical plane, in relation to said axis that are smaller than or equal to 25°, and preferably smaller than or equal to 10°, so as to be under what are referred to as Gaussian conditions, making it possible to obtain a stigmatism, that is to say a clearness of the projected image. It is advantageously a question of the rays reflected by the rear portion of the reflective surface 6.2 and 10.2.

The first projecting lens 8 comprises a focus 8.1 located on a portion of the reflective surface 6.2 that is located between the light source 6.3 and the rear edge 6.2.1 of said reflective surface 6.2. In the present case, the focus 8.1 is located on the rear edge 6.2.1 of the reflective surface 6.2. Such positioning of the focus makes it possible to image the rear portion of the illuminated reflective surface, in the present case its rear edge 6.2.1, and thus to form a clean cutoff corresponding to said edge. As illustrated by the path taken by the light rays, the projected image of the illuminated reflective surface is reversed, meaning that the rear edge forms an upper horizontal cutoff of the first light beam.

The second projecting lens 12 comprises a focus 12.1 located advantageously on a reflective surface 10.2, at a position between the front edge 12.2.2 and the rear edge 12.2.1 of said reflective surface 6.2. The focus 12.1 may be located on a portion of the reflective surface 10.2 that is located between the light source 10.3 and the rear edge 10.2.1 of said reflective surface 10.2.

The first and second projecting lenses 8 and 12 are contiguous at a joining axis 14. They are advantageously formed in one piece, that is to say made integrally without discontinuity between the two projecting lenses. Alternatively, they may be fitted to one another. They may also have an offset along a longitudinal axis, that is to say an axis parallel to the optical axis of each of the first and second lighting submodules.

Still with reference to FIG. 1, the lighting module 2 comprises an optical device 18 configured to return rays of the first lighting submodule 5 that would otherwise be lost towards the second projecting lens 12. These rays that would otherwise be lost come directly from the light source 6.3 and pass in front of the front edge 6.2.2 of the reflective surface 6.2 on the collector 6.1; they are therefore not reflected by the reflective surface 6.2. The optical device 18 comprises a first reflecting surface 18.1 disposed in front of the collector 6.1 so as to collect at least some of the rays coming directly from the light source 6.3 and bypassing the collector 6.2. This first reflecting surface 18.1 is thus located between the collector 6.1 and the first projecting lens 8. It is configured to reflect the rays in question in the direction of the opposite side of the dividing plane realized in FIG. 1 by the joining axis 14 and the common support 16, towards a second reflecting surface 18.2 of the optical device 18. Said second reflecting surface is then configured to reflect the rays in question towards the second projecting lens 12.

The optical device 18 thus makes it possible to illuminate the second projecting lens 12 with light that is produced by the subassembly 6 and would otherwise be lost. This means that, when only the first lighting submodule 5 is active, that is to say when the subassembly 6 is on, this light that would otherwise be lost will illuminate the second projecting lens 12 and thus ensure an illuminated appearance at the entirely of the first and second projecting lenses 8 and 12. It will be understood that the lighting power of the illumination of the second projecting lens 12 by the optical device 18 is weaker than the illumination of said second projecting lens 12 by the second lighting submodule 10. This difference in lighting power is not directly perceptible by an observer who is in front of the lighting module. This illumination of the second projecting lens 12 by the optical device 18 is also weak enough to not disrupt the second light beam when the second lighting submodule is active at the same time as the first lighting submodule.

The first reflecting surface advantageously has a parabolic or elliptical profile, in a longitudinal plane and in a transverse plane (perpendicular to the optical axis), such that the reflected rays converge at the dividing plane to then diverge before encountering the second reflecting surface 18.2. Such convergence is advantageous when the common support 16 extends longitudinally to the location where the reflected rays pass through between the first and second reflecting surfaces 18.1 and 18.2. The rays can then pass in front of a front edge of the common support 16 or through an orifice 16.1 formed in said common support.

The first reflecting surface 18.1 may be formed directly on the collector 6.1 by means of a continuation thereof, directly on the housing 4 or else on a specific part fastened to the housing 4 and/or to the collector 6.1.

The second reflecting surface 18.2 may have a rectilinear or almost rectilinear profile, in a longitudinal plane and/or in a transverse plane, so as to reflect the rays towards the majority of the input face of the second projecting lens 12, advantageously more than 80% of said input face.

The second reflecting surface 18.2 may be formed directly on the housing 4 or else on a specific part fastened to the housing 4. The second reflecting surface 18.2 may be formed directly on a wall of the housing 4 and covered with a reflective coating, in which case said surface is advantageously raised in relation to said wall so as to facilitate the positioning of a protective mask during the deposition of the reflective coating. The raising may be at least 1, 2 or 3 mm on average. A raising of the second reflecting surface also makes it possible to obtain optimum orientation of said surface.

Figure 2:
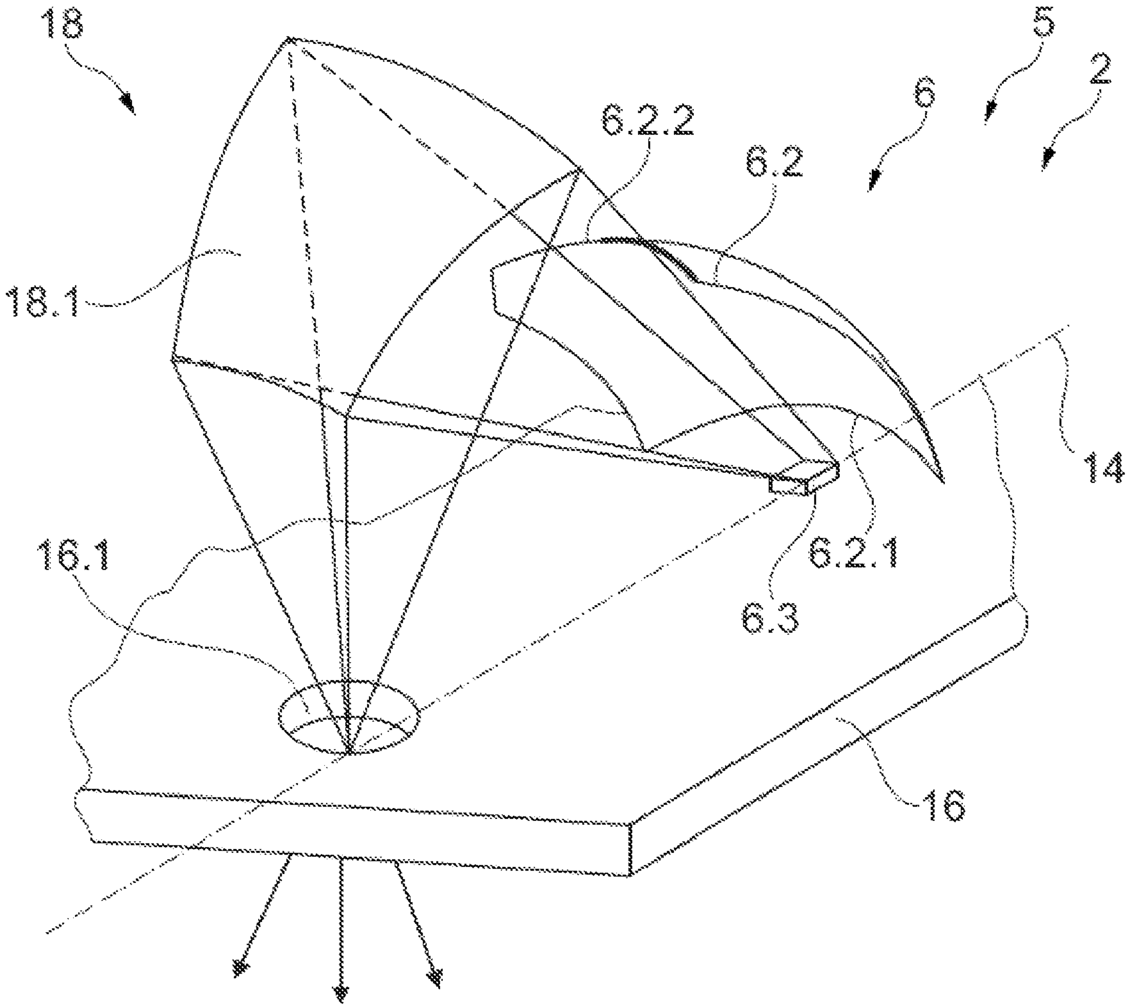
FIG. 2 is a perspective view of the cutoff lighting submodule and of the first reflecting surface of the optical device for returning light of the lighting module of FIG. 1.

FIG. 2 is a perspective view of the cutoff lighting module and of the first reflecting surface of the optical device for returning light of the lighting module of FIG. 1.

FIG. 2 realizes a non-zero thickness of the common support 16. It also illustrates the path taken by four extreme light rays emitted by the light source 6.3 that pass in front of the front edge 6.2.2 of the reflective surface 6.2 of the subassembly 6 of the first lighting submodule 5 and encounter the first reflecting surface 18.1 of the optical device 18. The parabolic or elliptical profiles of the reflective surface 6.2 of the collector 6.1 and of the first reflecting surface 18.1 of the optical device 18 are visible.

Figure 3:
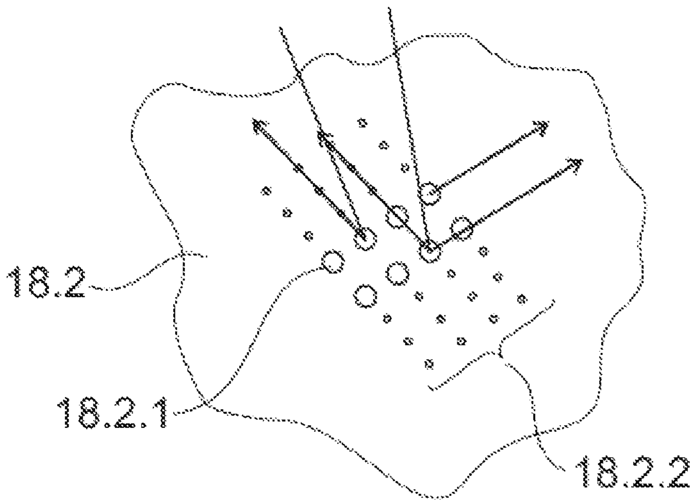
FIG. 3 is a perspective view of the second reflecting surface of the optical device for returning light of the lighting module of FIG. 1.

FIG. 3 is a perspective view of an example of the second reflecting surface of the optical device for returning light of the lighting module of FIG. 1.

The second reflecting surface 18.2 may have a rough surface structure. In this case, the second reflecting surface 18.2 may comprise a series of reliefs 18.2.1 disposed in the form of an array 18.2.2. These reliefs 18.2.1 can notably form steps or pads and the array 18.2.2 can notably be in the form of lines or a grid, respectively. The reliefs 18.2.1 and their array 18.2.2 may be configured to reflect the received light, mostly towards the second projecting lens 12, in a homogeneous manner. To that end, the reliefs 18.2.1 and their array 18.2.2 can provide a function of diffusing the received light that is, however, directed towards the second projecting lens 12.

Figure 4:
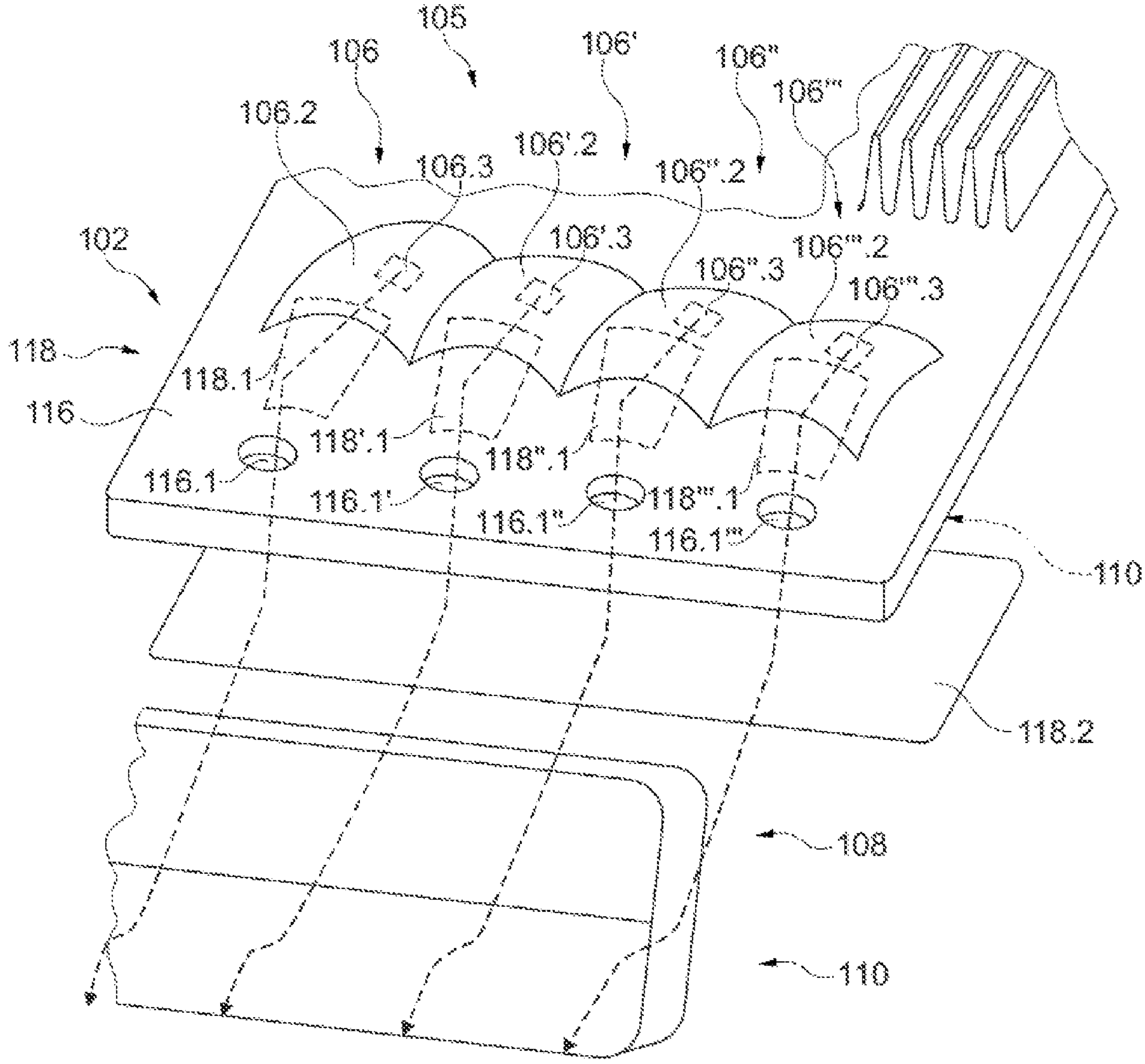
FIG. 4 is a perspective view of a lighting module according to a second embodiment of the invention.

FIG. 4 is a perspective view of a lighting module according to a second embodiment of the invention. The reference signs of the first embodiment are used to denote identical or corresponding elements, these numbers however being increased by 100. Reference is moreover made to the description of these elements given in the context of the first embodiment.

The lighting module 102 according to the second embodiment of the invention is distinguished from the lighting module of the first embodiment essentially in that the first lighting submodule comprises multiple subassemblies disposed next to one another. The first lighting submodule 105 specifically comprises a first subassembly 106 similar to the subassembly 6 of the first submodule 5 of the first embodiment. The first lighting submodule 105 further comprises a second subassembly 106' which is similar, or even identical, to the first subassembly 106 and is disposed next to said first subassembly 106. The first lighting submodule may also comprise additional subassemblies, such as a third subassembly 106" and a fifth subassembly 106'", all disposed next to one another on the same side of the dividing plane realized by the common support 116.

The lighting module further comprises a second lighting submodule 110, not visible, which is similar to the second lighting submodule 10 of the first embodiment and is located on the opposite side of the dividing plane realized by the common support 116.

The reflective surfaces 106.2, 106'.2, 106".2 and 106'".2 of said subassemblies 106, 106', 106" and 106'" are advantageously adjacent to one another such that the collectors (which are not shown) on which they are formed can be in one piece. Each of the lighting modules 106, 106', 106" and 106'" produces a cutoff light beam, these light beams combining to form a regulatory lighting function of the low-beam type. To that end, one of the lighting modules 106, 106', 106" and 106'" can form a wide beam with a straight cutoff, another a narrow beam with a cutoff having a kink, and another a narrow beam with a straight cutoff.

The optical device 118 in the present case comprises, in addition to the first reflecting surface 118.1, a third, a fourth and a fifth reflecting surface 118'.1, 118".1 and 118'".1, specifically one per subassembly 106, 106', 106" and 106'". The common support 116 may also comprise an orifice 116.1, 116.1', 116.1" and 116.1'" for each of the subassemblies 106, 106', 106" and 106'". The second reflecting surface 118.2 of the optical device 118 may be shared by the lighting modules 106, 106', 106" and 106'".

The first projecting lens 108 is shared by the subassemblies 106, 106', 106" and 106'". The second projecting lens 112 directly adjacent to the first projecting lens 108 is then illuminated over its entire transverse extent when only the first, third, fourth and fifth subassemblies 106, 106', 106" and 106' are active, while the second lighting submodule 110 is inactive.

It should be noted that the second lighting submodule 110 may comprise multiple subassemblies disposed next to one another, on the opposite side of the dividing plane realized by the common support.

Figure 5:
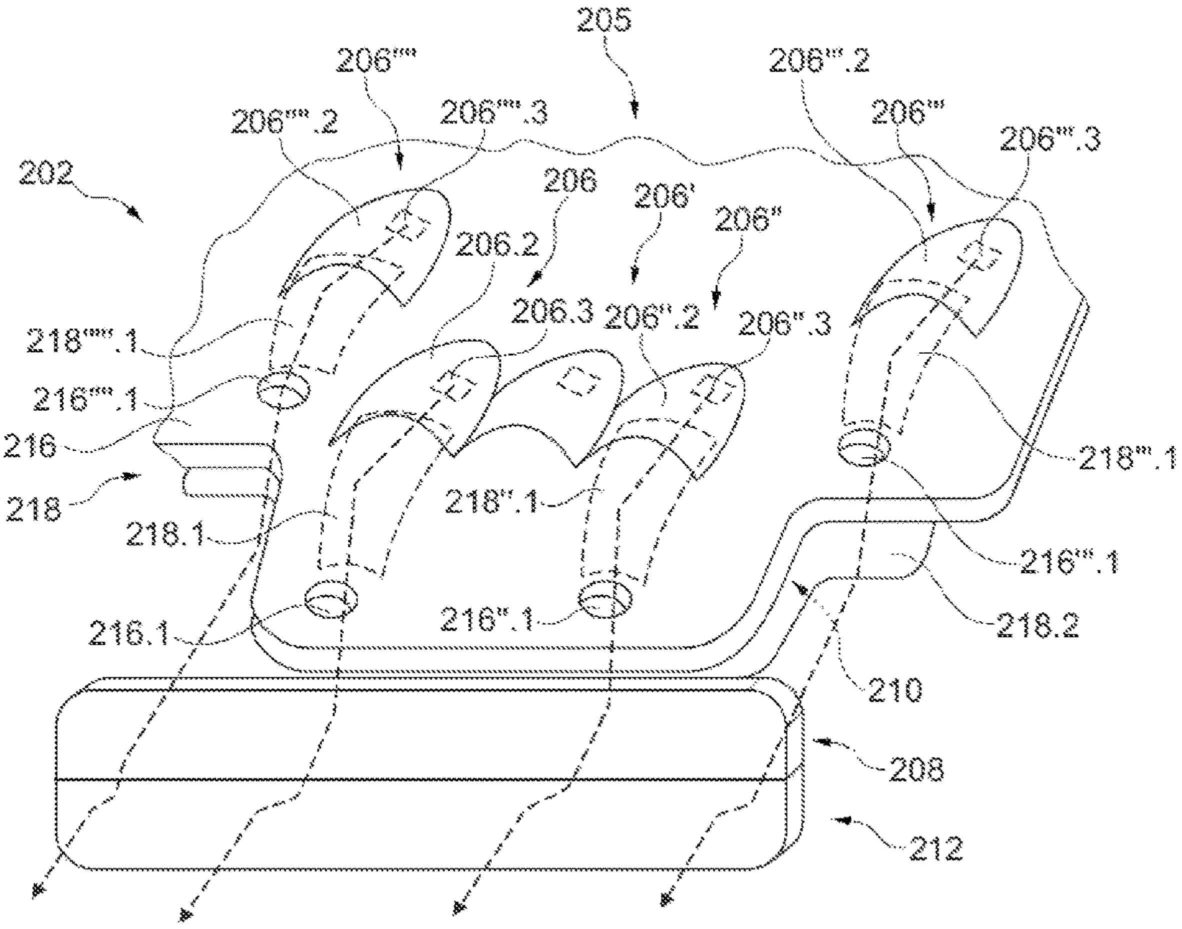
FIG. 5 is a perspective view of a lighting module according to a third embodiment of the invention.

FIG. 5 is a perspective view of a lighting module according to a third embodiment of the invention. The reference signs of the second embodiment are used to denote identical or corresponding elements, these numbers however being increased by 100. Reference is moreover made to the description of these elements within the context of the second embodiment.

The lighting module 202 according to the third embodiment of the invention is distinguished from the lighting module of the first embodiment essentially in that the first lighting submodule 205 comprises multiple subassemblies, similarly to the second embodiment. The first lighting submodule 205 specifically comprises a first subassembly 206 similar to the subassembly 6 of the first embodiment. The first lighting submodule 205 further comprises a second lighting submodule 206' which is similar, or even identical, to the first subassembly 206 and is disposed next to said first subassembly 206, and a third subassembly 206" which is similar, or even identical, to the first subassembly 206 and disposed next to the second subassembly 206' on the right-hand side in FIG. 5.

The first lighting submodule 205 further comprises a fourth and a fifth subassembly 206' and 206"" which are disposed respectively on either side of the central block of the first, second and fourth subassemblies 206, 206" and 206' and recessed along an optical axis of the first lighting submodule in relation to said central block. The first, second and third subassemblies 206, 206', 206" are also referred to as the first-category subassemblies. The fourth and fifth subassemblies 206'" and 206'" are also referred to as the second-category subassemblies.

In this case, similarly to the first-category subassemblies, each second-category subassembly 206'" and 206"" comprises a secondary light source 206'".3, 206"".3 and a secondary collector with a reflective surface 206'".2, 206"".2 that is able to reflect light rays emitted by said secondary light source in a secondary reflected light beam. In this case, the first projecting lens 208 is configured to project at least the majority of said secondary reflected light beam in a secondary projected light beam. Here, the secondary projected light beam is a narrow cutoff light beam having a kink.

The reflective surfaces 206.2, 106'.2 and 106".2 of the subassemblies 206, 206' and 106" are advantageously adjacent to one another such that the collectors (which are not shown) on which they are formed can be in one piece. Each of the subassemblies 206, 206' and 206" of the central block produces a spread cutoff light beam, while the recessed subassemblies 206'" and 206"" produce the narrow cutoff light beams having kinks that combine with one another. All these beams combine to form a regulatory lighting function of the low-beam type.

Similarly to the preceding embodiment, the lighting module 202 comprises a second lighting submodule 210, not visible, which is similar to the second lighting submodule 10 of the first embodiment and is located on the opposite side of the dividing plane realized by the common support 216.

The optical device 218 in the present case comprises, in addition to the first reflecting surface 218.1, a third, a fourth and a fifth reflecting surface 218".1, 218'".1 and 218'.1, specifically one per subassembly 206, 206", 206' and 206"". The common support 216 may also comprise an orifice 216.1, 216.1", 216.1'" and 216"".1 for each of the subassemblies 206, 206", 206'" and 206"". The second reflecting surface 218.2 of the optical device 218 may be shared by the subassemblies 206, 206", 206'" and 206'.

It can be observed that, among the central block of the subassemblies 206, 206' and 206", only the lateral subassemblies 206 and 206" are associated with a reflecting surface 218.1, 218".1 of the optical device 218, meaning that the central lighting module 206' does not contribute to the illumination of the second projecting lens.

It can also be observed that the fourth and second subassemblies 206' and 206"" are recessed in the rearward direction, along an overall propagation direction of the light rays along the optical axis of the first lighting submodule, in relation to the central block of the subassemblies 206, 206' and 206". To that end, the reflecting surfaces 218'".1 and 218"".1 of the optical device 218, which are associated with these subassemblies 206'" and 206', are also recessed in relation to the reflecting surfaces 218.1 and 218".1 associated with the central block. This recessing of the reflecting surfaces 218'".1 and 218'.1 allows the rays that would otherwise be lost and reflected downwards to be reflected by the second reflecting surface 218.2 at angles that are more favorable for lighting the second projecting lens 212. This recessing brings the reflecting surfaces 218'".1 and 218"".1 of the subassemblies 206'" and 206"" closer together in order to gather more rays coming directly from the light source of these subassemblies. As a result, the illuminated appearance of the second projecting lens is improved further.

Lastly, such a disposition also makes it possible to retain a certain compactness of the lighting module in terms of its height. This is because making the reflecting surfaces 218'".1 and 218'.1 recessed makes it possible to position them at a lower height, in the vicinity of the corresponding subassemblies 206'" and 206"".

What is claimed is:

1. A lighting module for a motor vehicle, comprising: a first lighting submodule, which is configured to produce a first light beam including: a subassembly with a primary light source and a primary collector with a reflective surface that is able to reflect light rays emitted by the primary light source in a primary reflected light beam; and a first projecting lens configured to project at least a majority of the primary reflected light beam in a primary projected light beam at least partially forming the first light beam, wherein the first projecting lens has a focal region located on the reflective surface of the primary collector, behind the primary light source; a second lighting submodule which is configured to produce a second light beam and includes a second projecting lens for projecting the second light beam, adjoining the first projecting lens; and an optical device configured to reflect, towards the second projecting lens, light rays coming directly from the primary light source of the first lighting submodule and passing in front of the reflective surface of the first lighting submodule so as to give the second projecting lens an illuminated appearance while the second lighting submodule is off.

2. The lighting module of claim 1, wherein the first lighting submodule and the second lighting submodule are disposed on either side of a dividing plane, with the rays reflected by the optical device passing through the dividing plane.

3. The lighting module of claim 1, wherein the optical device includes a first reflecting surface configured to reflect the light rays coming directly from the primary light source of the first lighting submodule, and a second reflecting surface configured to reflect the light rays reflected towards the second projecting lens.

4. The lighting module of claim 2, further including a support for the first lighting submodule or the second lighting submodule, extending along the dividing plane and having an orifice that is suitable for being traversed by the light rays reflected by the first reflecting surface.

5. The lighting module of claim 3, wherein the second reflecting surface has a rough surface structure.

6. The lighting module of claim 3, wherein the second reflecting surface has regular reliefs.

7. The lighting module of claim 3, wherein the first reflecting surface is disposed on a same side of the dividing plane as the first lighting submodule, and the second reflecting surface is disposed on a same side of the dividing plane as the second lighting submodule.

8. The lighting module of claim 3, further including a housing accommodating the first lighting submodule, the second lighting submodule, the first reflecting surface, or the second reflecting surface being formed on or supported by the housing.

9. The lighting module of claim 1, wherein the first projecting lens is configured to image a portion of the reflective surface of the primary collector, which is located along an overall direction of propagation of the reflected light rays in the first lighting submodule, behind the primary light source.

10. The lighting module of claim 1, wherein the subassembly is a first subassembly, where the first lighting submodule further includes a second subassembly having: a secondary light source; a secondary collector with a reflective surface that is able to reflect light rays emitted by the secondary light source in a secondary reflected light beam; wherein the second subassembly is recessed in the rearward direction, along an overall direction of propagation of the light rays, in relation to the first subassembly; wherein the first projecting lens is configured to project at least the majority of the secondary reflected light beam in a secondary projected light beam; and wherein the primary projected light beam and the secondary projected light beam together form the first light beam.

11. The lighting module claim 10, wherein the optical device is configured to also reflect, towards the second projecting lens, the light rays coming directly from the secondary light source and passing in front of the reflective surface of the secondary collector.

12. The lighting module of claim 10, wherein the optical device includes a third reflecting surface configured to reflect a number of light rays coming directly from the secondary light source towards the second reflecting surface, the second reflecting surface being configured to also reflect the light rays reflected by the third reflecting surface towards the second projecting lens.

13. The lighting module of claim 10, wherein the first and second projection lenses are formed as one piece.

14. The lighting module of claim 10, wherein the first and second projecting lenses each have different focal lengths.

* * * * *